(12) United States Patent
Addington

(10) Patent No.: US 12,158,228 B2
(45) Date of Patent: Dec. 3, 2024

(54) HANGER FOR MINING CONVEYING BELT

(71) Applicant: Haskell Addington, Jonesboro, TN (US)

(72) Inventor: Haskell Addington, Jonesboro, TN (US)

(*) Notice: Subject to any disclaimer, the term of this patent is extended or adjusted under 35 U.S.C. 154(b) by 0 days.

(21) Appl. No.: 18/107,314

(22) Filed: Feb. 8, 2023

(65) Prior Publication Data
US 2023/0250897 A1    Aug. 10, 2023

Related U.S. Application Data

(60) Provisional application No. 63/308,248, filed on Feb. 9, 2022.

(51) Int. Cl.
*F16L 3/02* (2006.01)
*E21F 13/06* (2006.01)

(52) U.S. Cl.
CPC ............ *F16L 3/02* (2013.01); *E21F 13/06* (2013.01)

(58) Field of Classification Search
CPC ..... F16L 3/02; F16L 3/24; F16L 3/245; E21F 3/06; A47G 25/0614; A47G 25/0678
USPC ........ 248/211, 213, 215, 234, 301, 303–304, 248/322, 339, 74.1
See application file for complete search history.

(56) References Cited

U.S. PATENT DOCUMENTS

| | | | | |
|---|---|---|---|---|
| 2,616,645 | A * | 11/1952 | Kindorf | F16L 3/11 248/62 |
| 2,891,752 | A * | 6/1959 | Genter | E21D 21/0093 248/231.91 |
| 3,163,389 | A * | 12/1964 | Thornburgh | E06C 7/14 248/211 |
| 3,167,286 | A * | 1/1965 | Sherburne | F16L 3/11 248/62 |
| 3,265,340 | A * | 8/1966 | Attwood | F16L 3/14 248/62 |
| 3,536,287 | A * | 10/1970 | Kramer | A47G 25/0614 248/909 |
| 4,267,994 | A * | 5/1981 | Lynch | F16L 55/035 248/65 |
| 4,407,478 | A * | 10/1983 | Hodges | F16L 3/133 248/62 |
| 5,740,994 | A * | 4/1998 | Laughlin | F16L 3/23 248/68.1 |
| 7,201,355 | B1 * | 4/2007 | Zien | A01K 5/01 248/339 |
| 7,641,356 | B2 * | 1/2010 | Pieroth | F21V 21/0885 248/339 |
| 7,789,359 | B2 * | 9/2010 | Chopp, Jr. | H02G 3/0456 248/210 |
| D882,381 | S * | 4/2020 | Bartos | D8/380 |
| 2003/0066938 | A1 * | 4/2003 | Zimmerman | F21S 4/10 248/304 |
| 2013/0015301 | A1 * | 1/2013 | Zvak | F16L 3/123 248/74.1 |

(Continued)

*Primary Examiner* — Christopher Garft
(74) *Attorney, Agent, or Firm* — Trevor T. Graves; Stites & Harbison PLLC

(57) ABSTRACT

A hanger for use with mining operations in an underground or surface mine is provided. The hanger includes a J-shaped body configured to receive a water line. The hanger further includes a hanger portion connected to the J-shaped body. The hanger portion is configured to attach to a channel located within the underground or surface mine.

6 Claims, 12 Drawing Sheets

(56) References Cited

U.S. PATENT DOCUMENTS

| | | | |
|---|---|---|---|
| 2014/0103170 A1* | 4/2014 | Zvak | F16L 3/137 |
| | | | 248/65 |
| 2016/0003375 A1* | 1/2016 | Robertson, Jr. | E21F 17/02 |
| | | | 248/341 |
| 2016/0341339 A1* | 11/2016 | Zvak | F16L 3/02 |
| 2017/0241569 A1* | 8/2017 | Bartos | F16B 45/00 |

* cited by examiner

HANGER FOR MINING CONVEYING BELT

This application claims the benefit of U.S. Provisional Patent Application Ser. No. 63/308,248, filed on Feb. 9, 2022, the disclosure of which is incorporated herein by reference.

TECHNICAL FIELD

This disclosure relates generally to the mining arts and, more particularly, to a hanger for a mining conveying belt utilized in underground and surface mining operations to hold water lines and the like.

BACKGROUND

In tunneling, mining and excavation operations, including underground mining and excavation, it is well known to drill holes in a face of rock or earth. For example, holes may be drilled into a face of rock, which may be filled with explosives for detonation and excavation. Furthermore, drilling may occur in a face or roof of a mine for insertion of a bolt, such as to support a shaft of the mine or a mining conveying belt for various mining operations. To perform these drilling operations, it is common to use a mining machine known in the vernacular as a "roof bolter." Typically, a roof bolter is capable of both forming (drilling) boreholes and then installing roof anchors or "bolts" in the boreholes.

It is standard practice to also provide a water line, such as a fresh water line and a discharge water line, to be used with the conveying belt within the underground mine. Generally, the water line requires additional drilling in the mine for insertion of roof bolts to support a belt hanger with a chain that drop downs such that the water may be hung thereto. As should be appreciated, additional drilling in the mine increases expense in terms of both time and labor as it is typically a two person job. In addition, other equipment is required for the drilling operation for the water line, including glue insertion, use of resin bolts, L-shaped belt bracket, chain and hook. The additional equipment also takes up valuable and limited space within the mine as the chain often gets in the worker's way during cleaning and other mining operations.

An alternative to additional drilling in the mine for insertion of roof bolts to support a belt hanger with a chain that drop downs such that the water may be hung thereto is placing the water directly on the floor of the mine. While this eliminates the additional equipment, such as the chain extending from the mine, space is often limited within and around the mine. Accordingly, the placement of the water directly on the floor still occupies valuable space within the mine and can pose problems for workers trying to navigate within the mine.

Consequently, it would be advantageous to have a more efficient way to hang a water line in an underground or surface mine that does not require extensive time, labor and equipment to insert within the mine and utilizes minimal space within the mine. Accordingly, this disclosure contemplates a hanger and method of installing hanger to a channel within the underground or surface mine, which saves time and increases efficiency of the mining operation.

SUMMARY

In accordance with one aspect of the disclosure, a hanger for use with mining operations in an underground or surface mine is provided. The hanger includes a J-shaped body configured to receive a water line. The hanger further includes a hanger portion connected to the J-shaped body. The hanger portion is configured to attach to a channel located within the underground or surface mine.

In one embodiment, the J-shaped body forms a recess for receiving the water line. The mounting portion may include a tab configured to fit flush with the channel. The water line may be one of a fresh water line and a discharge water line. The hanger portion may include an aperture for receiving a fastener to secure the hanger to the channel. The hanger portion may include a tab forming an inverted U-shape for fitting over the channel. The J-shaped body may include an elastomeric pad to directly contact the water line. The hanger may be made of metal.

In another embodiment, the hanger portion includes a tab and a hole defining a pair of split ends. The split ends are flared upwards at an angle of approximately 45 degrees. The hole is configured to receive a fastener to secure the hanger to the channel.

In accordance with another aspect of the disclosure, a device for use with a mining conveying belt is provided. The device includes a unitary structure having a first end for supporting a water line associated with the mining conveying belt and a second end for connecting to a support associated with the mining conveying belt.

In one embodiment, the first end includes J-shaped hook defining an internal recess for receiving the water line and the second end includes a hanging element. The J-shaped hook is connected to the hanging element via an angled intermediate piece and a substantially vertical element. The hanging element includes a first tab extending substantially perpendicular to the vertical element and a second tab connected to the first tab, said second tab extending substantially perpendicular to the first tab. The first tab is configured to be flush with a top edge of the support and the second tab is configured to be flush with a rear edge of the support. The hanging element includes at least one tab defining an opening for receiving a fastener. The substantially vertical element includes an elongated slot for receiving a portion of the fastener.

In accordance with yet another aspect of this disclosure, a hanger for attaching to a channel for a mining operation is provided. The hanger includes a first rounded end configured to receive a water line and a second end including a tab with an aperture configured to connect to the channel. The hanger further includes a vertical piece connecting the first end to the second end, said vertical piece having an elongated slot and a support mounted on the vertical piece and extending to the first end. The hanger also includes a retention fastener configured to extend between the hole and the elongated slot such that the hanger is securely fastened to the support.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings:

FIG. 8 is a side view of the hanger in FIG. 7 for use with a water line on a mining conveying belt forming one aspect of this disclosure;

DETAILED DESCRIPTION

Figure 1:
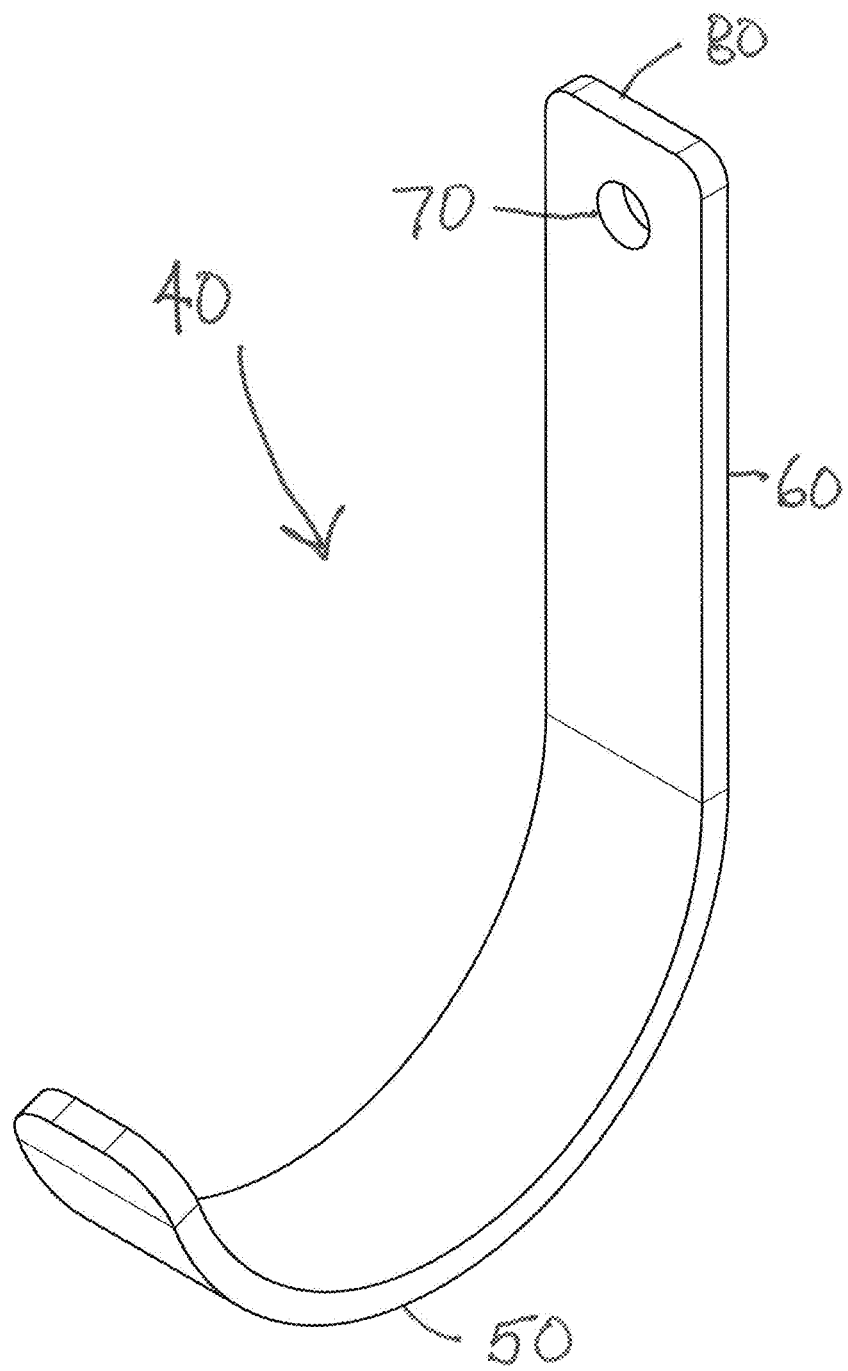
FIG. 1 is a side perspective view of a lower hanger for use with a water line on a mining conveying belt forming one aspect of this disclosure.

In the following detailed description, reference is made to the accompanying drawings and photographs that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a hanger for use with a water line in an underground mine is hereinafter described.

Reference is now made to FIGS. 1-12, which illustrate various hangers that may be used with a water line in underground mining operations. With respect to FIG. 12, a representative channel 10 that is typically mounted within an underground mine is shown. The channel 10 includes multiple rollers 20 mounted thereon. A pair of belt hangers with drop-down chains 30 extend from the roof (R) of the mine. Roof bolts (not shown) are positioned within holes drilled in the roof (R) of the mine, such that the belt hangers are supported by the roof bolts.

Instead of inserting additional holes into the roof (R) of the mine for additional belt hangers with chains to support a water line 420 (independent of the support), one or more of the hangers shown in FIGS. 1-11 may be utilized. The lower hanger 40 illustrated in FIG. 1 includes a rounded or J-shaped body 50. As specifically shown in FIG. 1, the J-shaped body is connected to a substantially vertical body portion 60. The vertical body portion 60 has an aperture 70 cut through it near the top edge 80 of the vertical body portion 60. A fastener (not shown) may be used to connect/secure the lower hanger to the channel. Either a fresh water line or discharge water line may sit within J-shaped body 50, which holds and supports the line. The hanger 40 is typically made of a rigid material, such as a metal, i.e., steel. It should be appreciated that multiple hangers may be used to fully support and hold a water line 20. The water line 20 may between two and eight inches in thickness and is often made of aluminum or PVC pipe. It should be appreciated that the hangers may come in different sizes to accommodate different sizes of water lines.

Figure 2:
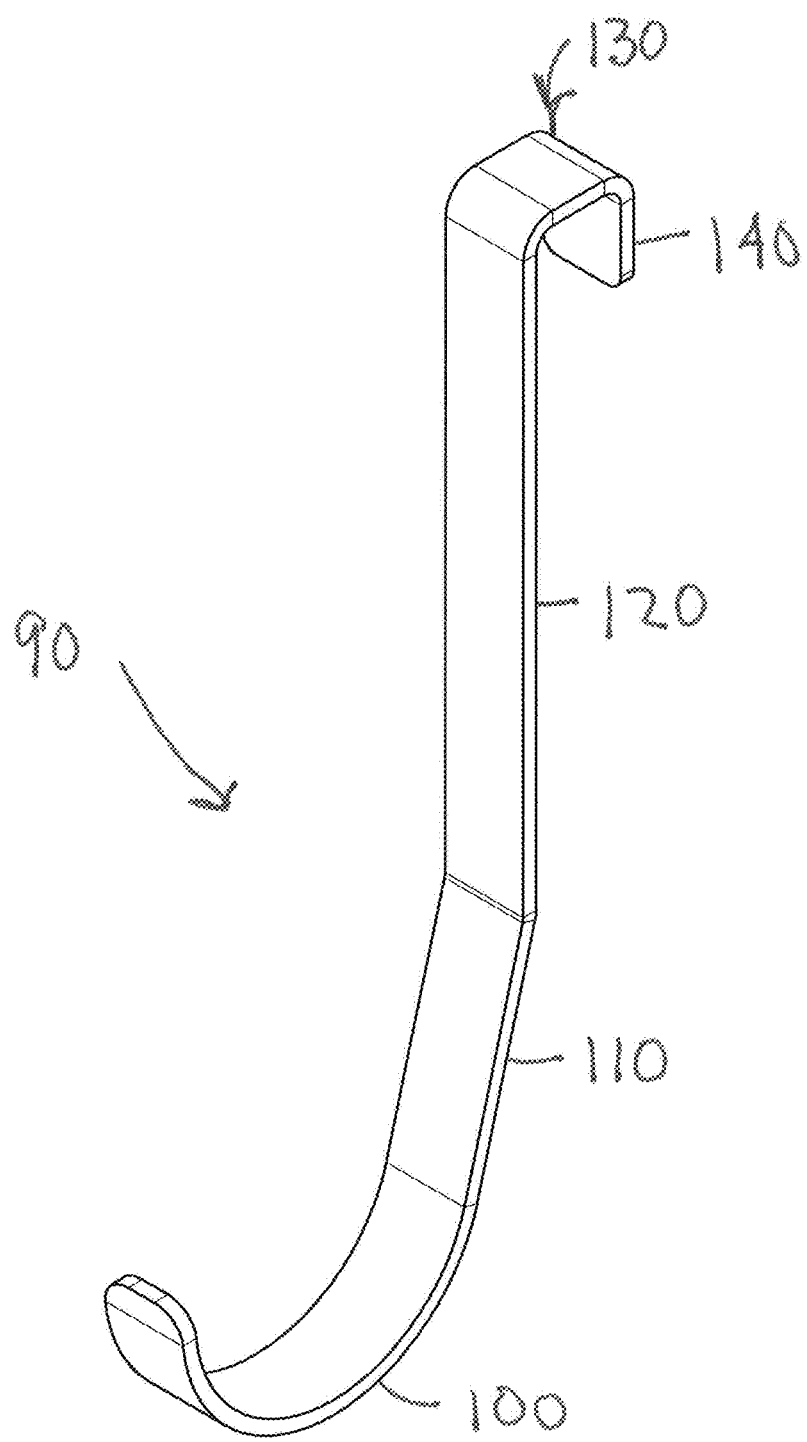
FIG. 2 is a perspective view of another lower hanger for use with a water line on a mining conveying belt forming one aspect of this disclosure.
Figure 3:
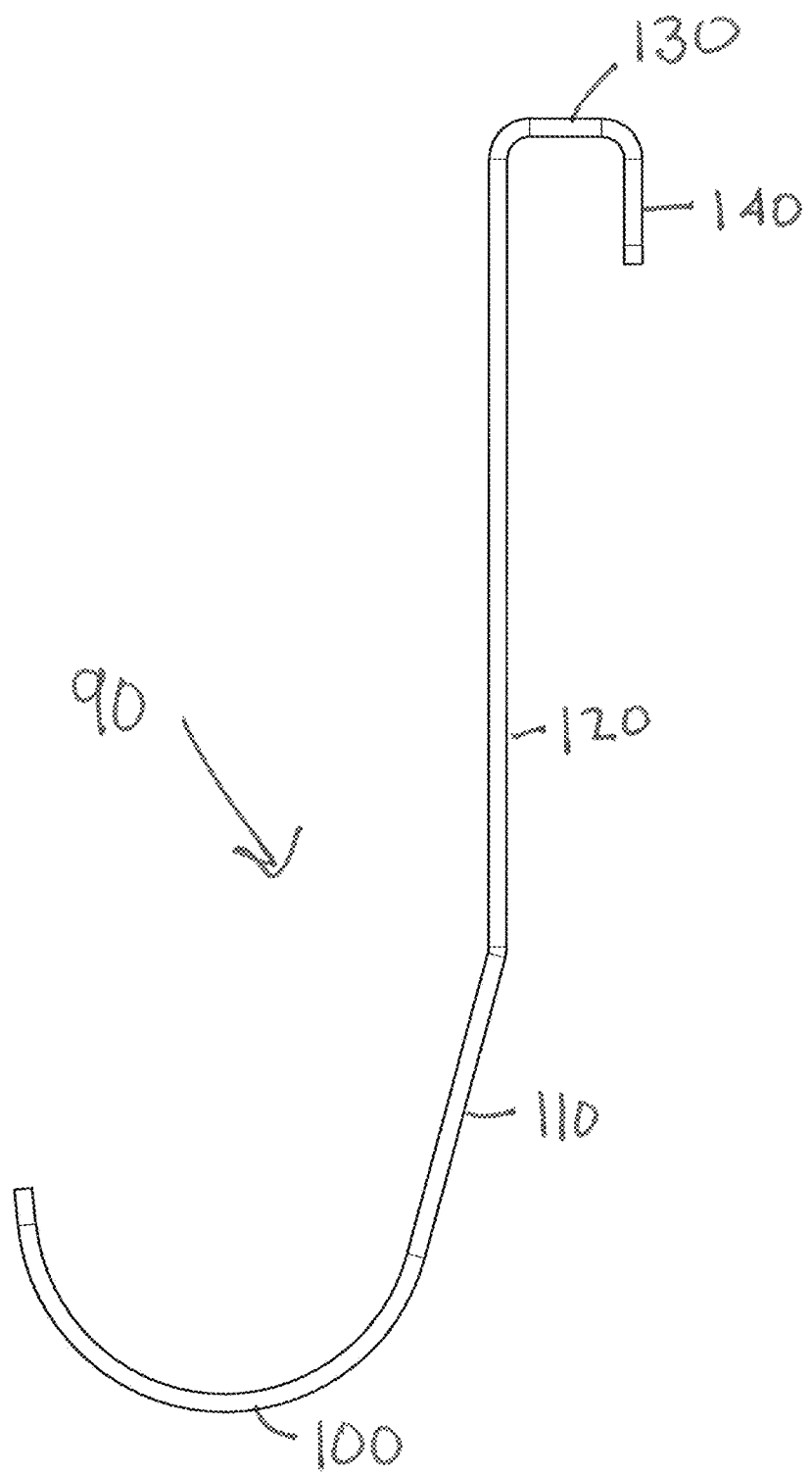
FIG. 3 is a side view of the hanger in FIG. 2 for use with a water line on a mining conveying belt forming one aspect of this disclosure.

Turning to FIGS. 2 and 3, another lower hanger 90 is illustrated. The lower hanger 90 includes a J-shaped body 100 connected to an intermediate piece 110, which is slightly angled. The intermediate piece 110 is connected to a substantially vertical portion 120, which in turn is connected to a hanger portion 130 that is configured to engage with the channel 10. Specifically, the hanger portion 130 includes a tab 140 extending in a direction substantially parallel to the vertical portion 120. The hanger 90 is typically made of a rigid material, such as a metal, i.e., steel. The underside of the hanger portion 130 is slightly rounded into the tab 140 to form a better fit around the channel. Either a fresh water line or discharge water line may sit within J-shaped body 100. Advantageously, this hanger 90 may be used without any additional fasteners, i.e., the tab 140 engages directly with the channel. Specifically, the hanger portion 130 extends over the top of the channel such that the tab 140 "hooks" on the top of the channel to secure the hanger firmly in place. When the water line is placed within the body, the tab 140 more firmly engages with the channel such that it is essentially "locked" into place.

Figure 4:
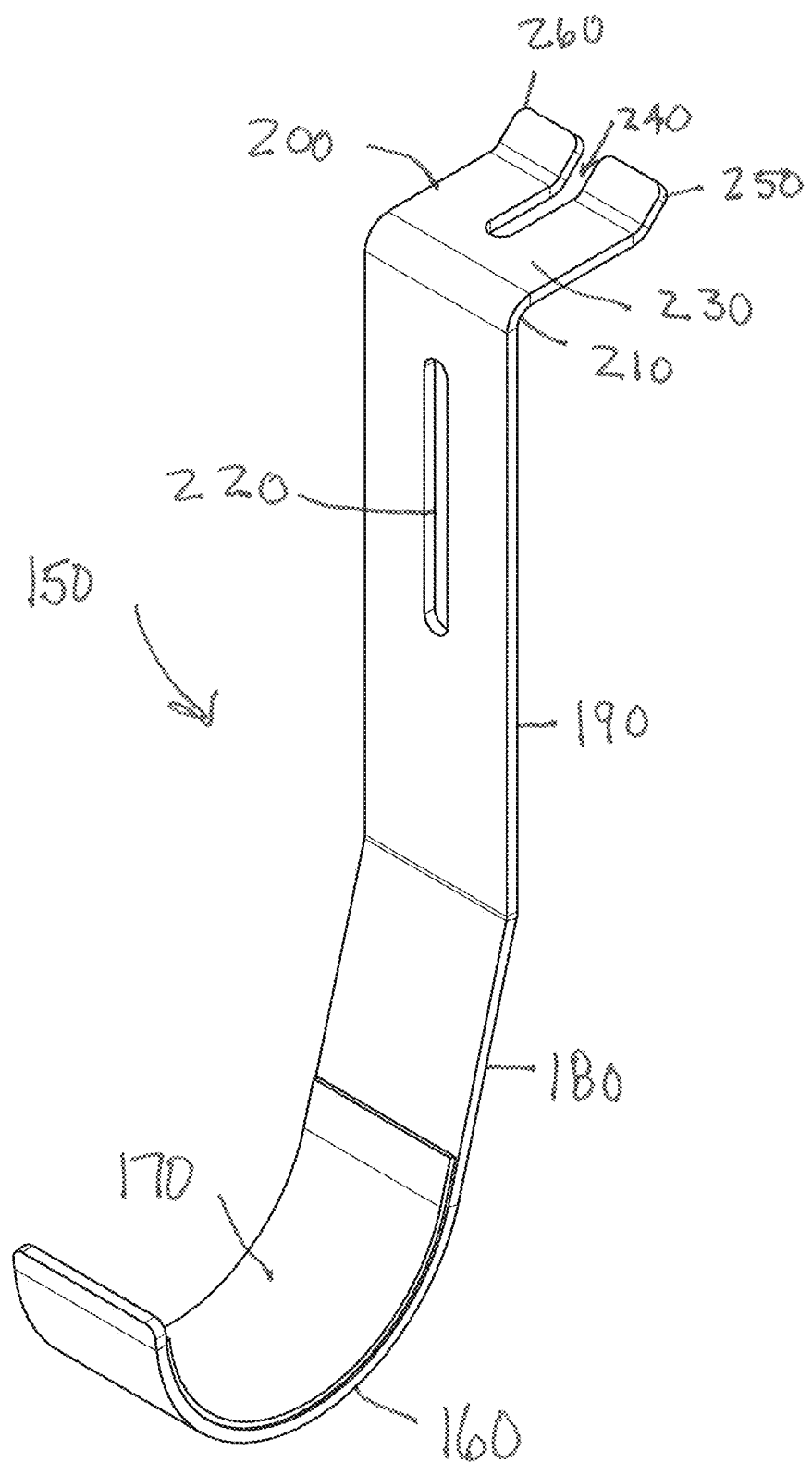
FIG. 4 is a perspective view of yet another lower hanger for use with a water line on a mining conveying belt forming one aspect of this disclosure.
Figure 5:
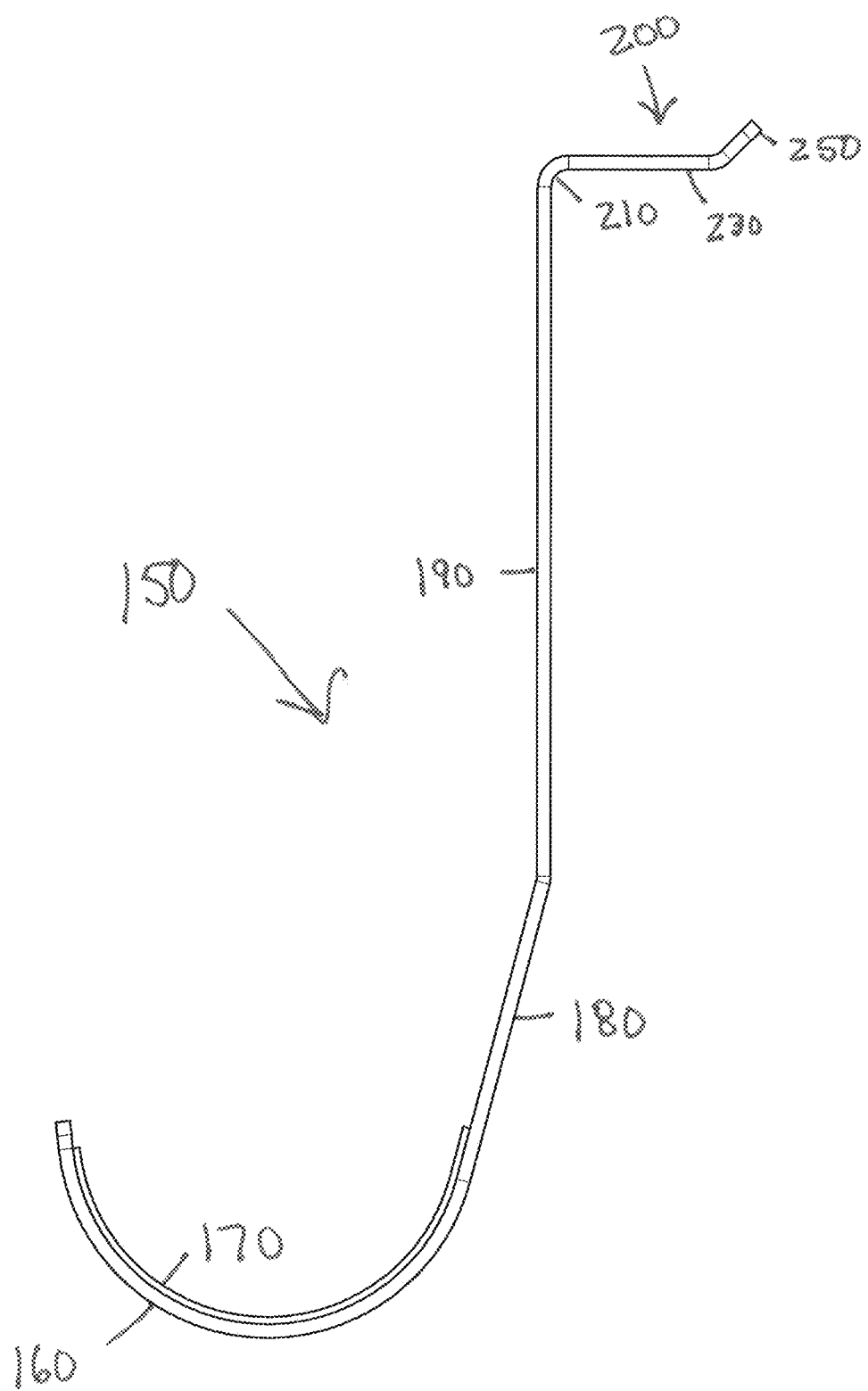
FIG. 5 is a side view of the hanger in FIG. 4 for use with a water line on a mining conveying belt forming one aspect of this disclosure.
Figure 6:
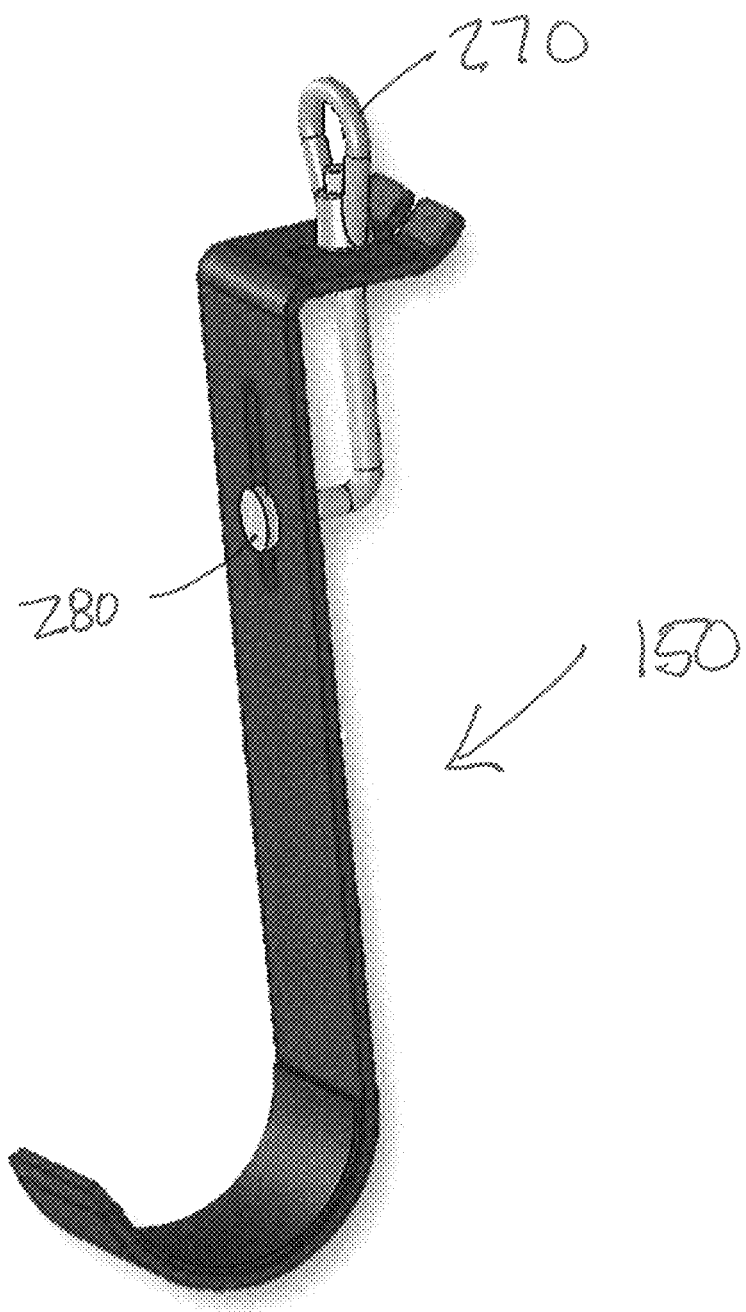
FIG. 6 is a perspective view of the hanger in FIG. 4 with a retention fastener for use with a water line on a mining conveying belt forming one aspect of this disclosure.

With reference to FIGS. 4-6, a lower hanger 150 is illustrated. The hanger 150 is typically made of a rigid material, such as a metal, i.e., steel. The lower hanger 150 includes a J-shaped body 160. An elastomeric pad 170 may be positioned within the J-shaped body 160 to directly contact the water line, such that there is not a rigid material to rigid material connection between the hanger 150 and the water line. Either a fresh water line or discharge water line may sit within J-shaped body 100. The J-shaped body 160 is connected to an intermediate piece 180, which is slightly angled. The intermediate piece 180 is connected to a substantially vertical portion 190, which in turn is connected to a hanger portion 200 via a slightly curved portion 210. that is configured to engage with the channel 10. The substantially vertical portion 190 has an elongated slot 220 positioned through its front face.

The hanger portion 200 includes a tab 230 extending in a direction substantially perpendicular to the vertical portion 190. A keyhole-shaped hole 240 is cut into the tab 230 such that its distal end is separated into two ends 250, 260. These ends 250, 260 are flared upward at approximately a forty-five degree (45°) angle. Specifically, the hanger portion 200 extends over the top of the channel such that the tab 230 hangs on the top of the channel to secure the hanger 150 firmly in place. As shown in FIG. 6, a retention fastener 270 extends between the two ends 250, 260 through the hole 240 and an end portion 280 engages with the elongated slot 220 to secure/lock the hanger 150 to the channel.

Figure 7:
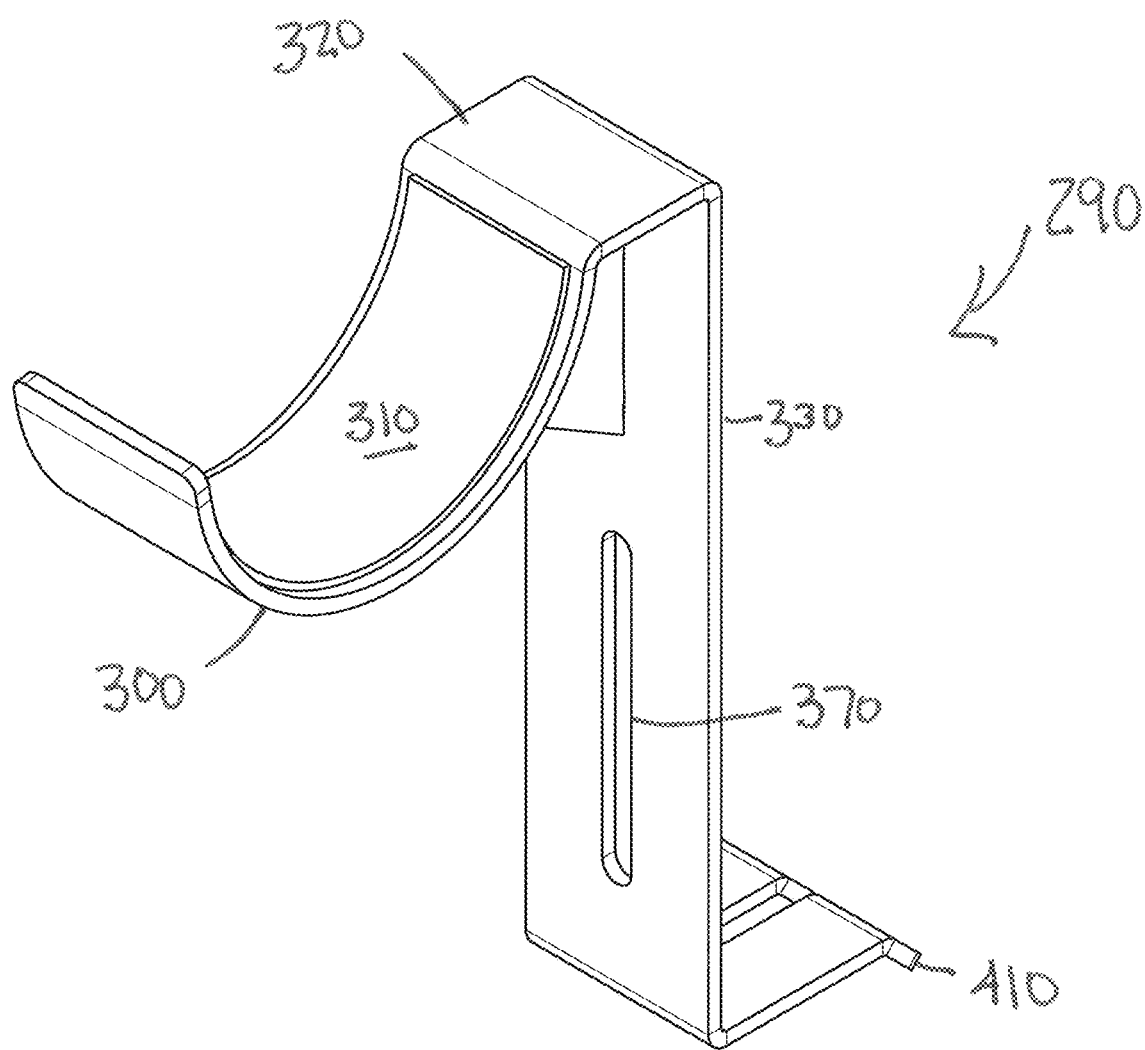
FIG. 7 is a perspective first side view of an upper hanger or use with a water line on a mining conveying belt forming one aspect of this disclosure.
Figure 7:
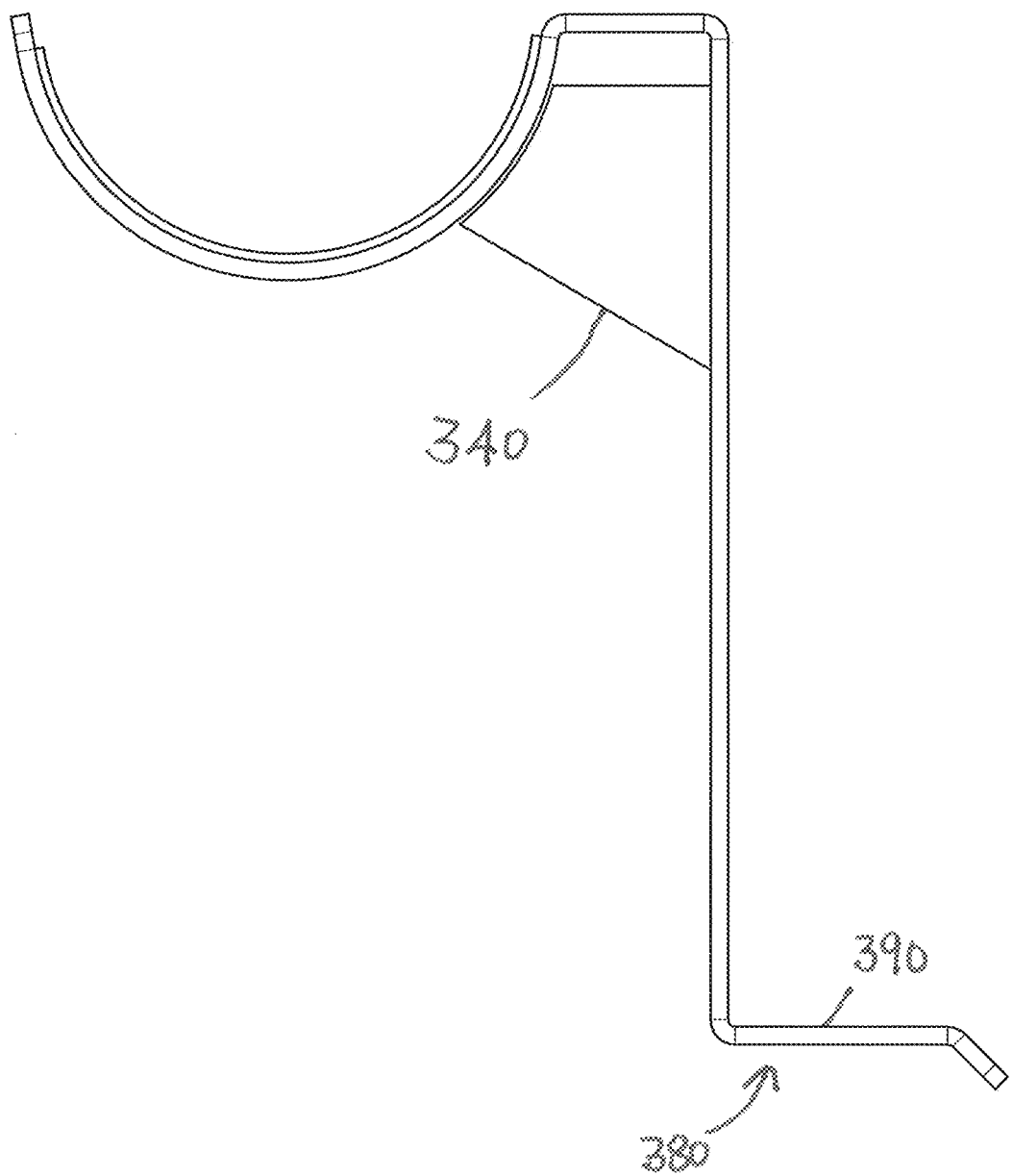
Figure 9:
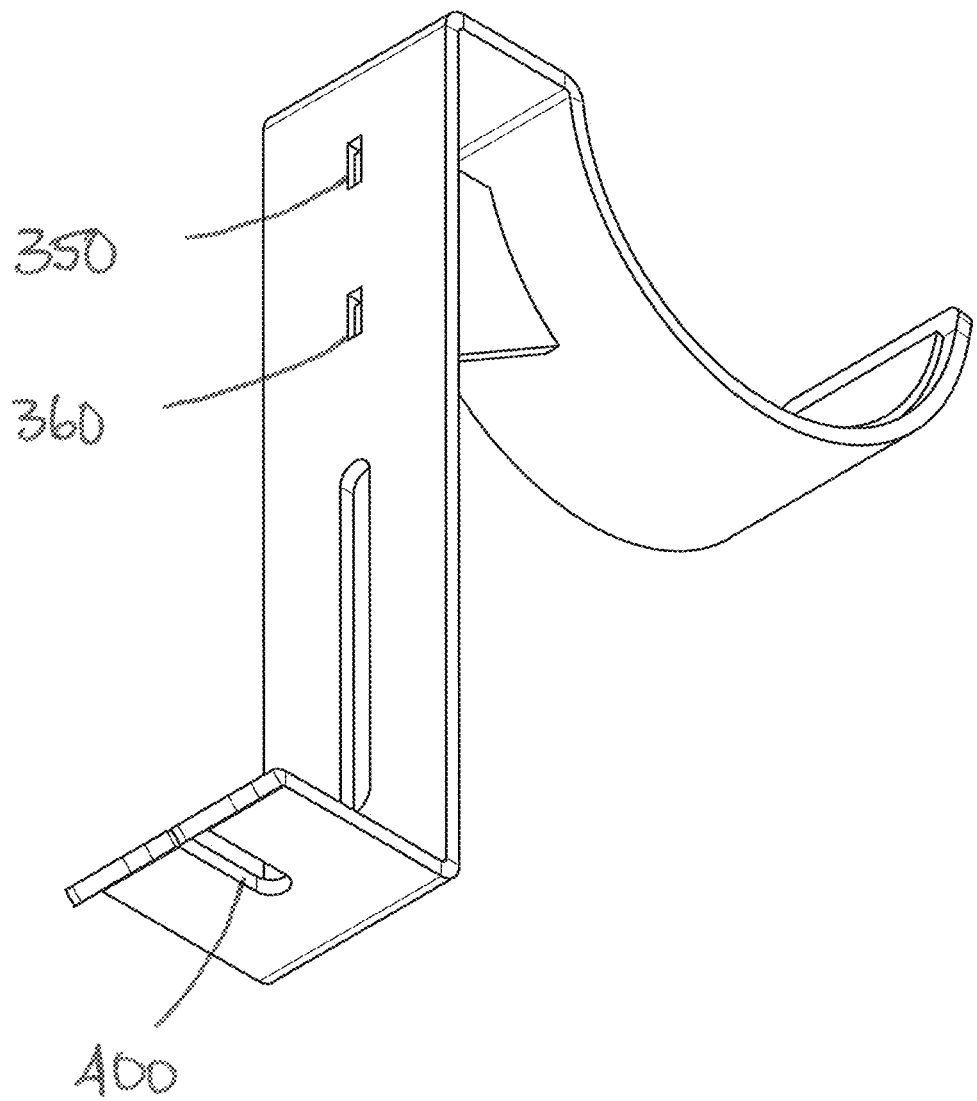
FIG. 9 is a perspective second side view of the hanger in FIG. 7 for use with a water line on a mining conveying belt forming one aspect of this disclosure.
Figure 10:
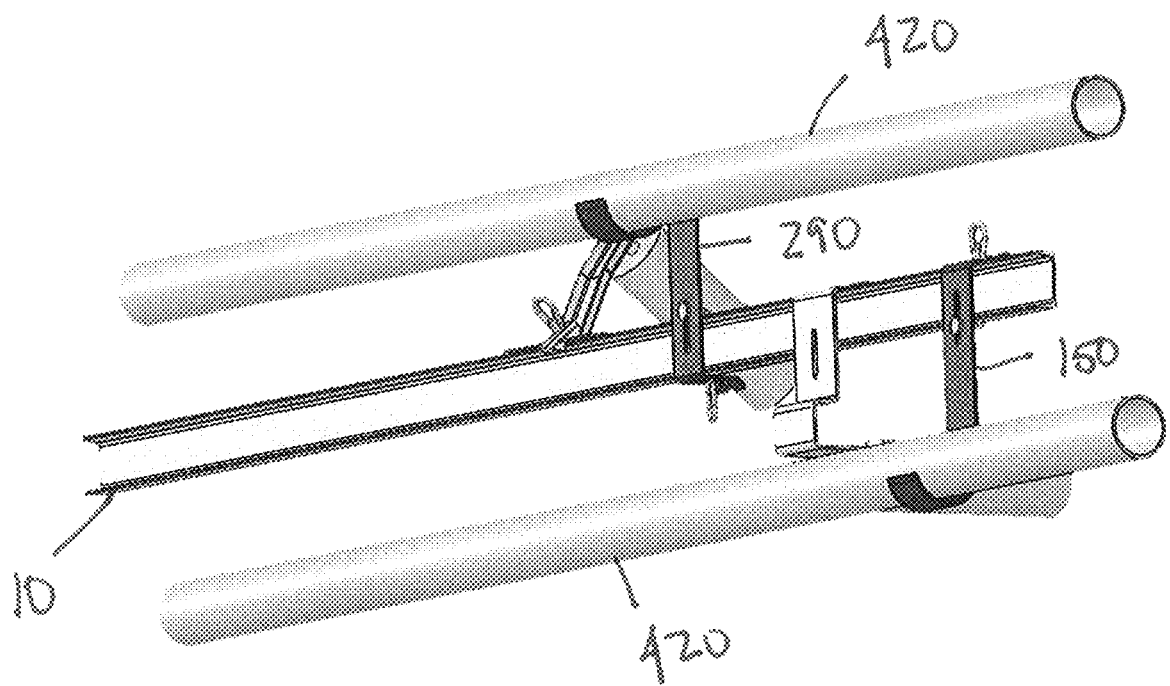
FIG. 10 is a front perspective view of an upper hanger holding a fresh water line and a lower hanger holding a discharge water line forming one aspect of this disclosure.
Figure 11:
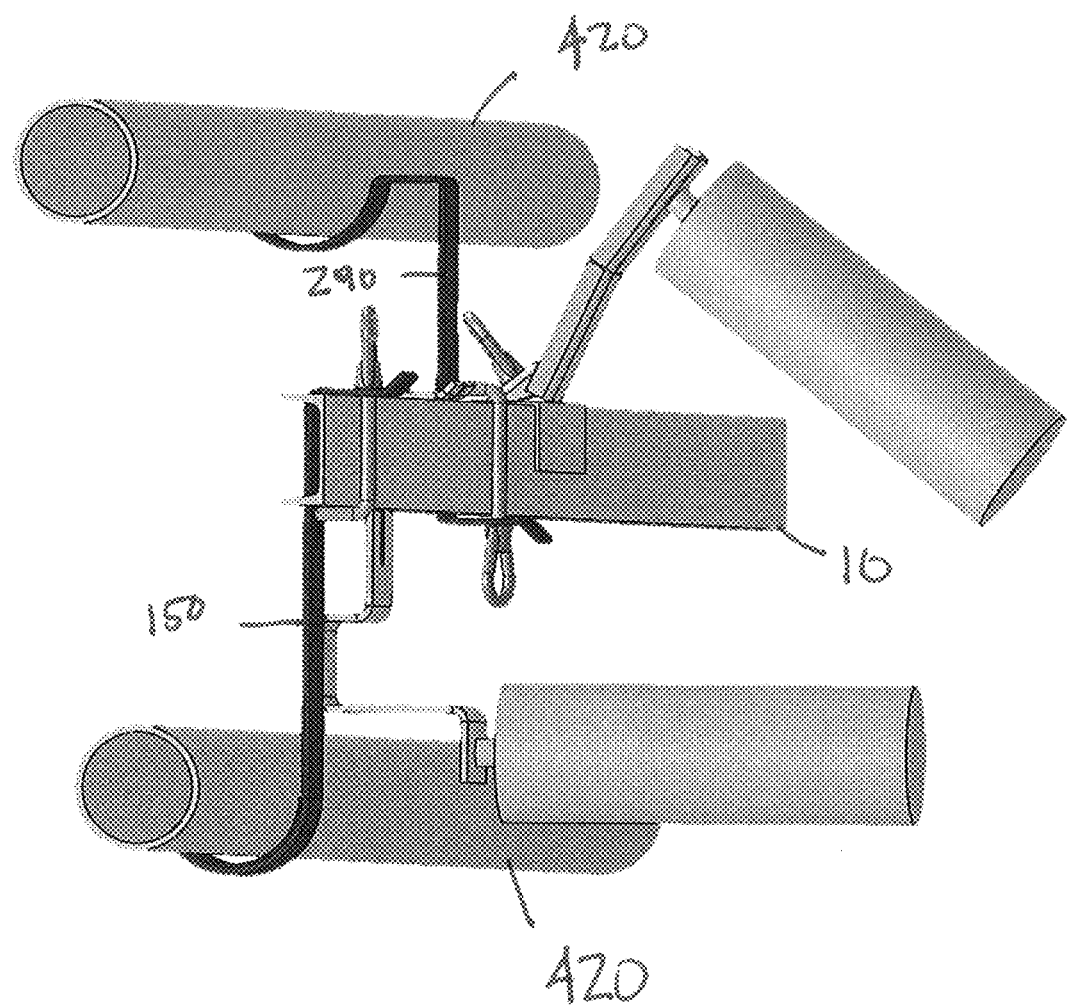
FIG. 11 is a rear perspective view of an upper hanger holding a fresh water line and a lower hanger holding a discharge water line forming one aspect of this disclosure.
Figure 12:
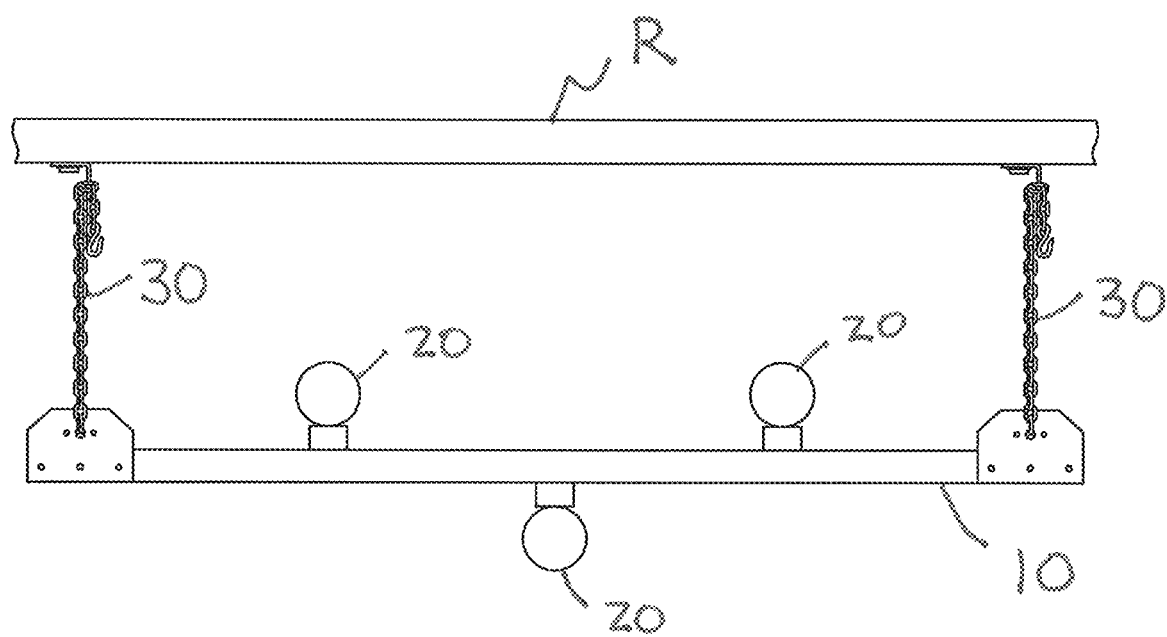
FIG. 12 is a front view of a representative channel supporting rollers within a mine forming one aspect of this disclosure.

With reference to FIGS. 7-9, an upper hanger 290 is illustrated. The upper hanger 290 is typically made of a rigid material, such as a metal, i.e., steel. The lower hanger 290 includes a J-shaped body 300. An elastomeric pad 310 may be positioned within the J-shaped body 300 to directly contact the water line, such that there is not a rigid material to rigid material connection between the hanger 150 and the water line. Either a fresh water line or discharge water line may sit within J-shaped body 300. The J-shaped body 300 is connected to a connector piece 320, that in turn connects to a substantially vertical piece 330. A support 340 connects to the vertical piece 330 and the J-shaped body 300 to provide additional support for holding the line. The support 340 fits within two notches 350, 360 positioned in the vertical piece 330 and extends outward until contacting and supporting the J-shaped body 300. An elongated slot 370 is positioned below the support 340. The vertical piece 330 extends downward until connected to a hanger portion 380. The hanger portion 380 includes a tab 390 extending perpendicular to the vertical piece 330. A keyhole-shaped cutout 400 is in the tab and the tab has a downward-shaped end piece 410. The hanger portion 380 extends over the top of the channel such that the tab 390 hangs on the top of the channel to secure the hanger 390 firmly in place. A retention fastener extends through the cutout 400 and the slot 370 to secure/lock the hanger 290 to the channel.

Advantageously, the hangers described herein offers a number of advantages. Initially, the hangers may be easily installed on the channel by a single person without the use of any additional tools or drilling within the mine. Because the hangers connect directly to the channel, they occupy minimal space within the mine and is out of the way of fasteners and vibration from the roller of the conveying belt. In addition, the hangers may be used with a fresh water line on a belt conveyor and/or a discharge water line on a belt conveyor. For example, one or more hangers may be used on a first side of the channel for use with a fresh water line on the belt conveyor and one or more additional hangers may be used on a second, opposite side of the channel for use with a discharge water line on the belt conveyor.

The foregoing descriptions of various embodiments have been presented for purposes of illustration and description. These descriptions are not intended to be exhaustive or to limit the invention to the precise forms disclosed. The embodiments described provide the best illustration of the inventive principles and their practical applications to thereby enable one of ordinary skill in the art to utilize the disclosure in various embodiments and with various modifications as are suited to the particular use contemplated.

The invention claimed is:

1. A device for use with a mining conveying belt, comprising:

a unitary structure including a first end for supporting a water line associated with the mining conveying belt and a second end for connecting to a support associated with the mining conveying belt, wherein the first end includes a J-shaped hook defining an internal recess for receiving the water line, wherein the second end includes a hanging element configured to receive a fastener, wherein the J-shaped hook is connected to the hanging element via an angled intermediate piece and a substantially vertical element including an elongated slot for receiving a portion of the fastener, wherein the hanging element includes a tab including an opening defining a pair of split ends for receiving the fastener, and wherein a distal end of the split ends are flared upwards at an angle of approximately 45 degrees away from the J-shaped hook.

2. A hanger for attaching to a channel for a mining operation, comprising:

a first rounded end configured to receive a water line on a top face;

a second end including a tab with an aperture configured to connect to the channel, said aperture defining a pair of split ends, and wherein a distal end of the pair of split ends are flared downwards in a direction away from the first rounded end;

a vertical piece connecting the first end to the second end, said vertical piece having an elongated slot;

a support mounted on the vertical piece and extending to the first end such that said support contacts a bottom face of said first end; and a retention fastener configured to extend between the pair of split ends and the elongated slot such that the hanger is securely fastened to the support.

3. The hanger of claim 2, wherein the hanger is made of metal.

4. The hanger of claim 2, further including an elastomeric pad configured to be positioned within the first rounded end to directly contact the water line.

5. The hanger of claim 2, wherein the vertical piece including at least one notch such that the support fits within the at least one notch.

6. The hanger of claim 2, wherein the aperture is a keyhole-shaped cutout.

* * * * *